(12) United States Patent
Cohen et al.

(10) Patent No.: US 9,136,626 B2
(45) Date of Patent: Sep. 15, 2015

(54) ELECTRICAL CONNECTION SYSTEM

(75) Inventors: Brian Cohen, Perrysburg, OH (US);
Raymond Domsic, Grosse Ile, MI (US)

(73) Assignee: FIRST SOLAR, INC, Perrysburg, OH (US)

( * ) Notice: Subject to any disclaimer, the term of this patent is extended or adjusted under 35 U.S.C. 154(b) by 270 days.

(21) Appl. No.: 13/328,563

(22) Filed: Dec. 16, 2011

(65) Prior Publication Data

US 2012/0156946 A1 Jun. 21, 2012

Related U.S. Application Data

(60) Provisional application No. 61/424,473, filed on Dec. 17, 2010.

(51) Int. Cl.
| | |
|---|---|
| *H01R 4/48* | (2006.01) |
| *H01R 12/77* | (2011.01) |
| *H01R 13/20* | (2006.01) |
| *H01R 13/187* | (2006.01) |
| *H02S 40/34* | (2014.01) |
| *H01R 4/04* | (2006.01) |
| *H01R 13/52* | (2006.01) |

(52) U.S. Cl.
CPC ............ *H01R 12/774* (2013.01); *H01R 13/187* (2013.01); *H01R 13/20* (2013.01); *H02S 40/34* (2014.12); *H01R 4/04* (2013.01); *H01R 4/48* (2013.01); *H01R 13/5216* (2013.01); *Y10T 29/49117* (2015.01)

(58) Field of Classification Search
USPC .......................................... 439/754, 833, 873
See application file for complete search history.

(56) References Cited

U.S. PATENT DOCUMENTS

| | | | |
|---|---|---|---|
| 3,918,788 A | 11/1975 | Walter et al. | |
| 4,257,821 A * | 3/1981 | Kelly et al. ................... | 136/244 |
| 4,310,211 A | 1/1982 | Bunnell et al. | |
| 4,460,232 A | 7/1984 | Sotolongo | |
| 4,623,753 A | 11/1986 | Feldman et al. | |
| 4,654,470 A | 3/1987 | Feldman et al. | |
| 5,280,133 A | 1/1994 | Nath | |
| 5,409,549 A | 4/1995 | Mori | |
| 6,182,403 B1 | 2/2001 | Mimura et al. | |
| 6,582,249 B1 | 6/2003 | Boeck et al. | |
| 6,709,301 B2 * | 3/2004 | Lee .............................. | 439/857 |
| 7,097,516 B2 | 8/2006 | Werner et al. | |

(Continued)

FOREIGN PATENT DOCUMENTS

| | | |
|---|---|---|
| EP | 1 729 369 A2 | 12/2006 |
| KR | 1009 30103 B1 | 12/2009 |

(Continued)

OTHER PUBLICATIONS

Multi Contact Solarline, Connector System for Photovoltaic, Oct. 2009, pp. 1-48.

*Primary Examiner* — Neil Abrams
*Assistant Examiner* — Travis Chambers
(74) *Attorney, Agent, or Firm* — Dickstein Shapiro LLP

(57) ABSTRACT

A photovoltaic module lead foil connection system includes a wire having a fastener. The system can include a cord plate on a surface of the photovoltaic module where a conductive lead is adjacent to the module at the cord plate. The conductive lead provides external electrical access to the photovoltaic module. The system can include a fastener configured to electrically connect an end of a wire to the conductive lead at a junction mount within the cord plate.

31 Claims, 4 Drawing Sheets

(56) References Cited

U.S. PATENT DOCUMENTS

| | | |
|---|---|---|
| 7,134,883 B2 | 11/2006 | Werner et al. |
| 7,285,006 B1 | 10/2007 | Daily et al. |
| 7,291,036 B1 | 11/2007 | Daily et al. |
| 7,365,965 B2 | 4/2008 | Higashikozono et al. |
| 7,444,743 B2 * | 11/2008 | Feldmeier et al. ............ 29/748 |
| 7,530,837 B2 | 5/2009 | Nieleck et al. |
| 7,618,265 B2 * | 11/2009 | Rueggen et al. ............ 439/76.1 |
| 7,824,189 B1 | 11/2010 | Lauermann et al. |
| 7,824,190 B2 * | 11/2010 | Beck et al. ................... 439/76.1 |
| 7,880,098 B2 | 2/2011 | Grimberg et al. |
| 7,931,488 B2 | 4/2011 | Giefers |
| 7,939,754 B2 | 5/2011 | Richter et al. |
| 7,960,650 B2 * | 6/2011 | Richter et al. ................. 174/50 |
| 7,963,813 B2 * | 6/2011 | Buller et al. ................. 439/884 |
| 7,972,177 B2 * | 7/2011 | Richter .................. 439/620.26 |
| 8,033,859 B2 * | 10/2011 | Giefers ........................ 439/441 |
| 8,192,233 B2 * | 6/2012 | Duesterhoeft et al. ... 439/620.21 |
| 8,308,504 B2 * | 11/2012 | Ackermann et al. .......... 439/496 |
| 8,771,026 B2 * | 7/2014 | Lin ............................... 439/786 |
| 8,771,027 B2 * | 7/2014 | Zhang et al. .................. 439/835 |
| 2005/0269312 A1 | 12/2005 | Gerhardinger |
| 2007/0137689 A1 | 6/2007 | Feldmeier et al. |
| 2009/0272574 A1 * | 11/2009 | Richter et al. ................ 174/548 |
| 2010/0108376 A1 | 5/2010 | Richter et al. |
| 2010/0216336 A1 | 8/2010 | Quiter et al. |
| 2010/0218797 A1 | 9/2010 | Coyle et al. |
| 2010/0218802 A1 | 9/2010 | Quiter |
| 2010/0263704 A1 | 10/2010 | Fornage et al. |
| 2011/0000709 A1 | 1/2011 | Ilchev |
| 2011/0139483 A1 | 6/2011 | Richter |
| 2011/0168228 A1 | 7/2011 | McGreevy et al. |
| 2011/0183531 A1 | 7/2011 | Hornung et al. |
| 2011/0244719 A1 * | 10/2011 | Xue et al. ..................... 439/575 |
| 2011/0269347 A1 | 11/2011 | Ackermann et al. |

FOREIGN PATENT DOCUMENTS

| | | | |
|---|---|---|---|
| WO | WO 2008095670 A1 * | 8/2008 | |
| WO | WO 2010/105051 A1 | 9/2010 | |
| WO | WO-2011 111915 | 9/2011 | |

\* cited by examiner

ELECTRICAL CONNECTION SYSTEM

CROSS-REFERENCE TO RELATED APPLICATIONS

This application claims priority to U.S. Provisional Patent Application No. 61/424,473, filed Dec. 17, 2010 and entitled ELECTRICAL CONNECTION SYSTEM, which is hereby incorporated by reference in its entirety.

TECHNICAL FIELD

In general, the present invention relates to photovoltaic modules and, more specifically, to apparatuses and methods used to provide an external electrical connection to the photovoltaic module.

BACKGROUND OF THE INVENTION

One challenge in solar energy industry is to maintain a sufficient electrical connection between a photovoltaic module in a photovoltaic array and the wires connecting the module to other modules or hardware, especially after being exposed to varying environmental factors, such as temperature, humidity, sun exposure, or combinations thereof. Insufficient electrical connections to photovoltaic modules can adversely impact the reliability of a photovoltaic array and can reduce the power output of the photovoltaic array.

DETAILED DESCRIPTION OF THE INVENTION

Figure 1:
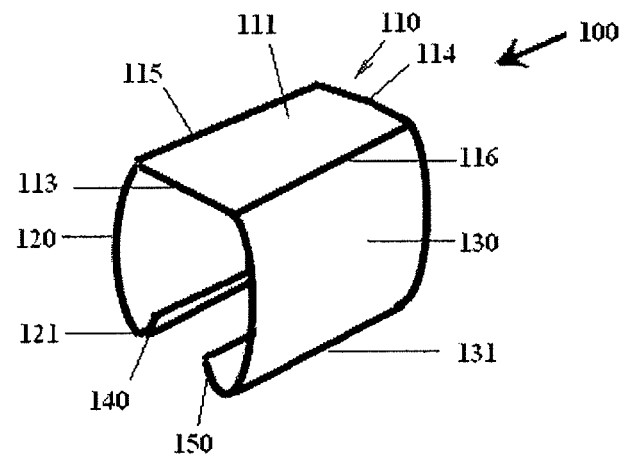
FIG. 1 is a perspective view of a clip.

In one aspect, the present invention is a clip such as a lead foil clip that maintains an electrical connection between a wire and a photovoltaic module to which the wire is connected. In another aspect, the present invention can include a method of using a clip in combination with sealing a contact space, eventually curing to form a bond between the electrical output source and the wire to provide additional stability for a secure electrical connection.

A photovoltaic module can be electrically connected to other photovoltaic modules or to other hardware in a photovoltaic array. Specifically, a conductor within the photovoltaic module can provide external electrical access from a conductor outside the module (such as an output wire) to the photovoltaic module to connect the module to another module or to other hardware. The conductor within the module can be electrically connected to the photovoltaic cells in the photovoltaic module, for example, through an electrical buss. The conductor within the module can include any suitable conducting material having any suitable shape and dimensions to connect to photovoltaic cells in the photovoltaic module. The conductor within the module can include a conductive lead, such as a lead foil. A photovoltaic module can have one or more positive lead foils and one or more negative lead foils. Some current methods of electrical connection between the wire and the photovoltaic module include soldering the photovoltaic module lead foil to the wire. In some instances, other methods besides soldering might be effective in the absence of a soldering cavity, solder paste, and other equipment to operate.

In one aspect, a photovoltaic module connection system may include a wire for conducting electricity. The system can include a junction mount on a surface of a photovoltaic module. The system can include a conductive lead adjacent to the photovoltaic module at the junction mount. The conductive lead can provide external electrical access to the photovoltaic module. The system can include a fastener that can electrically connect an end of the wire to the conductive lead. The fastener may include a metal. The fastener may include a galvanized metal sheet. The fastener may include a conductive material. The fastener may include a protective coating. The fastener can be clamped to the electrical connection end of the wire. The fastener can be crimped to the electrical connection end of the wire. The fastener can be soldered to the electrical connection end of the wire.

The junction mount may include a terminal attached to an end of the conductive lead. The terminal can be configured to connect to the fastener. The junction mount may include a portion of a cord plate. The portion of the cord plate can be configured to connect to the fastener to secure the conductive lead. The conductive lead may include a lead foil. The fastener can be configured to secure the lead foil around a portion of the junction mount. The fastener may include a coating to seal a space between the fastener and the junction mount. The coating can be electrically conductive.

A photovoltaic module lead foil connection system may include a junction mount. The junction mount can be configured to be on a surface of a photovoltaic module. The system can include a clip configured to electrically connect an end of a wire to a conductive lead adjacent to a photovoltaic module at the junction mount.

In one aspect, a method of electrically connecting a wire to a photovoltaic module can include positioning a conductive lead adjacent to a junction mount. The junction mount can be on a surface of a photovoltaic module. The method can include electrically connecting an end of a wire to the conductive lead with a fastener. The fastener can include a clip. The fastener can include a metal. The fastener can include galvanized metal sheet. The fastener can include a conductive material. The fastener can include a protective coating.

The step of electrically connecting an end of a wire to the conductive lead with a fastener can include clamping the fastener to the end of the wire. The step of electrically connecting an end of a wire to the conductive lead with a fastener can include crimping the fastener to the end of the wire. The step of electrically connecting an end of a wire to the conductive lead with a fastener can include soldering the fastener end of the wire. The method of electrically connecting a wire to a photovoltaic module can include attaching an end of the conductive lead to the junction mount after positioning the end of the conductive lead adjacent to the junction mount.

The junction mount can include a portion of a cord plate configured to connect to the fastener to secure the conductive lead. The conductive lead can include a lead foil. The fastener can be configured to secure the lead foil around a portion of the junction mount. The fastener can include a coating to seal a space between the fastener and the junction mount. The coating can be electrically conductive.

A photovoltaic module wire can include a wire comprising a fastener attached to an end of the wire. The fastener can be configured to electrically connect the end of the wire to a conductive lead adjacent to a photovoltaic module. The fastener can include a clip. The fastener can include metal. The fastener can include a galvanized metal sheet. The fastener can include a conductive material. The fastener can include a protective coating.

Figure 2:
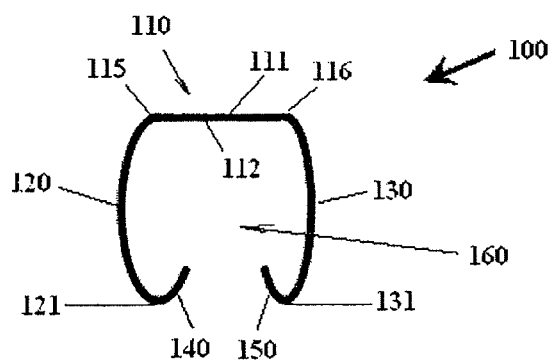
FIG. 2 is an end view of the clip.

In some embodiments, the fastener can include a clip and the electrical output of the solar module can be a lead foil or other suitable material for providing an external electrical connection or access to the solar module. Referring to FIG. 1 and FIG. 2, photovoltaic module clip 100 can include top plate 110 having top surface 111, bottom surface 112, first end 113, second end 114, first side edge 115, and second side edge 116. Top plate 110 can have a rectangular shape or any other suitable shape. Photovoltaic module clip 100 can include first side spring finger 120 extending from first side edge 115 of top plate 110, wherein first side spring finger 120 can include first terminal edge 121 away from bottom surface 112 of top plate 110. Photovoltaic module clip 100 can include second side spring finger 130 extending from second side edge 116 of top plate 110, wherein second side spring finger 130 can include second terminal edge 131 away from bottom surface 112 of top plate 110.

Photovoltaic module clip 100 can include first inward facing top gripping extension 140 projecting from first terminal edge 121 of first side spring finger 120. Photovoltaic module clip 100 can include second inward facing top gripping extension 150 projecting from second terminal edge 131 of second side spring finger 130. In some embodiments, photovoltaic module clip 100 can be configured to hold a lead foil around a ledge, a cross bar, or other suitable structure of a photovoltaic module cord plate in space 160 defined by top plate 110, first side spring finger 120, second side spring finger 130, first gripping extension 140, and second gripping extension 150.

The photovoltaic module clip can be comprised of or include metal, plastic, rubber, galvanized metal sheet, or any suitable material. Furthermore, the clip can have a coating configured to seal space 160 defined by top plate 110, first side spring finger 120, second side spring finger 130, first gripping extension 140, and second gripping extension 150. The coating can be electrically conductive.

In some embodiments, the clip can be configured to hold a lead foil around a central conductor of an insulated electrical wire in space 160.

Figure 3:
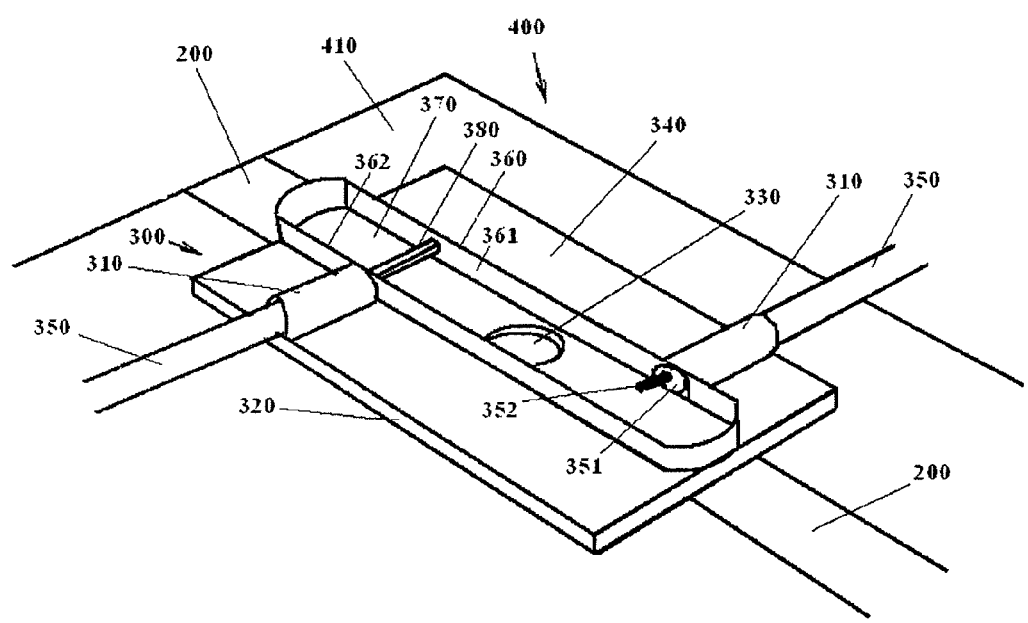
FIG. 3 is a perspective view illustrating a cord plate positioned on a cover plate of a photovoltaic module.

Referring to FIG. 3, cord plate 300 can be positioned adjacent to cover plate 410 of photovoltaic module 400. In some embodiments, cord plate 300 can include junction 310 and base 320, wherein cord plate 300 can be configured to be mounted to cover plate 410 by positioning base 320 adjacent to cover plate 410 of photovoltaic module 400. Cord plate 300 is positioned such that channel 330 is positioned over conductive lead 200. Conductive lead 200 can be, for example, lead foil or any other suitable conductive material. Conducting member can have any suitable shape or dimensions. In some embodiments, sealant can be used to fill channel 330 to secure the adhesion of cord plate 300 to photovoltaic module 400. As shown in FIG. 3, cord plate 300 includes junction 310, which can be a receptacle formed on top surface 340 of base 320 and configured to position and intersect second conductor 350 with conductive lead 200. Second conductor 350 can include insulated electrical wiring for carrying electrons either to or from conductive lead 200, depending on whether junction 310 is a "positive" junction or a "negative" junction (cord plate 300 can include each type of junction). Second conductor 350 can include outer protective layer 351 and central conductor 352. Conductive lead 200 can include any other suitable conductive strip adjacent to photovoltaic module 400.

Junction 310 can be used to position and secure second conductor 350 proximate to conductive lead 200. After they are correctly positioned, conductive lead 200 and second conductor 350 can be connected, for example, by clip 100. Second conductor 350 can be positioned in junction 310 either before or after cord plate 300 is positioned adjacent to cover plate 410 of photovoltaic module 400. Cord plate 300 can also include partition 360 extending from top surface 340 of base 320. Partition 360 can encircle channel 330 to define compartment 370 into which a flowable sealant can be received. Compartment 370 can also provide room for the connection of conductive lead 200 and second conductor 350. Partition 360 can include first inner sidewall 361 and second inner sidewall 362. Partition 360 can include ledge 380 extending from first inner sidewall 361.

Ledge 380 can extend across compartment 370 to contact second inner sidewall 362. Ledge 380 can also extend partially into compartment 370 without contacting second inner sidewall 362. Ledge 380 can be used to position and secure conductive lead 200. Cord plate 300 can also include a bar or any other suitable configuration to position and secure conductive lead 200 and second conductor 350. In some embodiments, secure conductive lead 200 can be attached and secured directly to central conductor 352 of second conductor 350. Cord plate 300 can be any suitable material, including any suitable plastic or polycarbonate, such as LEXAN500 (sold by SABIC Innovative Plastics). Cord plate 300 can be any suitable color, and can be transparent.

Figure 4:
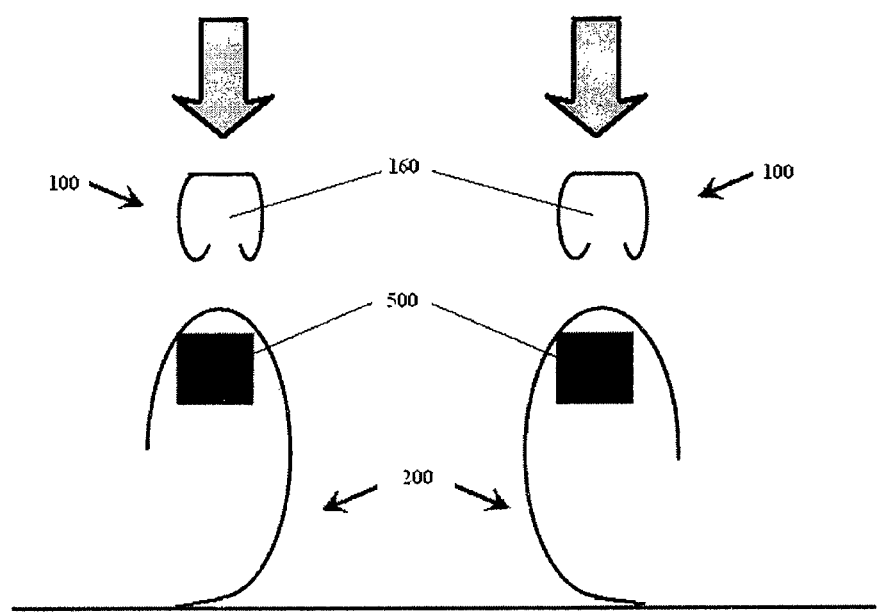
FIG. 4 is an end view illustrating the clips pushed to hold lead foil around a ledge of a cord plate.
Figure 5:
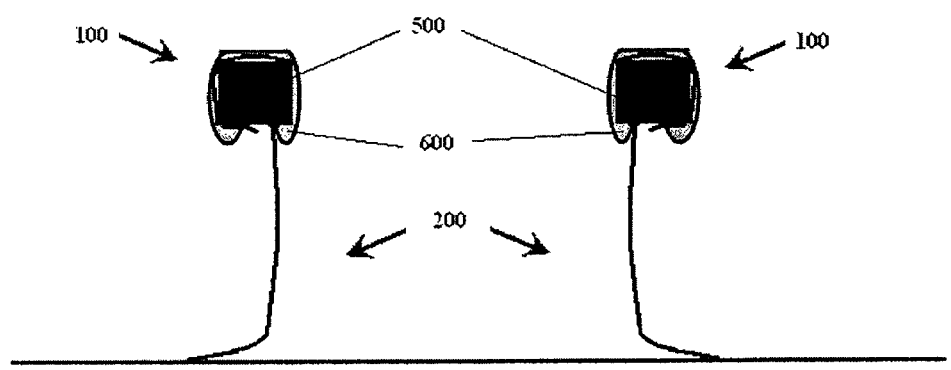
FIG. 5 is an end view illustrating the clips holding lead foil around a ledge of a cord plate.

Referring to FIG. 4 and FIG. 5, clips 100 attached to the ends of wires can be pushed to hold conductive lead 200 around junction mount 500. Junction mount 500 can be used to position and secure conductive lead 200. Junction mount 500 can include central conductor 352 of second conductor 350 or ledge 380 of cord plate 300 (FIG. 3). Junction mount 500 can include a cross bar, a ledge, or any other suitable configuration to position and secure conductive lead 200 or other conductor. One conductive lead 200 can include a positive contact area and the other conductive lead 200 can include a negative contact area, to connect to positive and negative wires, respectively. In this manner, conductive lead 200 can be connected to the photovoltaic device at one end (not shown). Conductive lead 200 can be put around junction mount 500. Clips 100 can be electrically connected to wires to provide external electrical access to the photovoltaic module. Clips 100 can be pushed to hold conductive lead 200 around junction mount 500 in space 160. In some embodiments, clips 100 can be pushed to hold both conductive lead 200 and the corresponding wire around junction mount 500 in space 160. In some embodiments, the junction mount can be a post on the cord plate or it can be attached to the end of the lead foil.

In some embodiments, as shown in FIG. 5, sealant 600 can be included to seal space 160 after the electrical connection is made. Sealant 600 can be electrically conductive. To do so, the clip can have a coating configured to seal space 160. The coating can be electrically conductive. In other embodiments, the clip can be dipped in an adhesive to the top plate, and then inserted to hold the lead foil and the ledge. The adhesive will be pushed up and seal the cavity in space 160. The adhesive can be electrically conductive. In some embodiments, the photovoltaic module clip can have different design of its top plate to accommodate with specific cord plate.

With the photovoltaic module clip, the connection can be a mechanical/electrical connection that is more stable and easier to maintain than soldering after being exposed to varying environmental factors, such as temperature, humidity, sun exposure, or combinations thereof. It can be used with different kinds of cord plates or connectors. With the clip, the process can be standard and save a lot of field work. It can also have a more robust electrical connection between the connecting wire and the photovoltaic module.

A number of embodiments of the invention have been described. Nevertheless, it will be understood that various modifications may be made without departing from the spirit and scope of the invention. It should also be understood that the appended drawings are not necessarily to scale, presenting a somewhat simplified representation of various preferred features illustrative of the basic principles of the invention.

What is claimed as new and desired to be protected by Letters Patent of the United States is:

1. A photovoltaic module connection system comprising:
a wire for conducting electricity;
a cord plate configured to be positioned on a surface of the photovoltaic module;
a conductive lead for providing external electrical access to the photovoltaic module;
wherein the cord plate comprises a sidewall extending outward from a surface of the cord plate and defining a compartment on the surface of the cord plate, the surface containing an opening through which the conductive lead extends from beneath the cord plate to a junction mount within the compartment defined by the sidewall; and
a fastener that electrically connects an end of the wire to the conductive lead at the junction mount, the fastener comprising:
a top plate comprising a first side edge, a second side edge, and a bottom surface;
a first side spring finger extending from the first side edge of the top plate to a first terminal edge away from the bottom surface of the top plate;
a second side spring finger extending from the second side edge of the top plate to a second terminal edge away from the bottom surface of the top plate;
a first top gripping extension projecting from the first terminal edge of the first side spring finger toward the bottom surface of the top plate; and
a second top gripping extension projecting from the second terminal edge of the second side spring finger toward the bottom surface of the top plate.

2. The system of claim 1, wherein the fastener comprises metal.

3. The system of claim 1, wherein the fastener comprises a galvanized metal sheet.

4. The system of claim 1, wherein the fastener comprises a conductive material.

5. The system of claim 1, wherein the fastener comprises a protective coating.

6. The system of claim 1, wherein the fastener is clamped to the end of the wire.

7. The system of claim 1, wherein the fastener is crimped to the end of the wire.

8. The system of claim 1, wherein the fastener is soldered to the end of the wire.

9. The system of claim 1, wherein the junction mount comprises a terminal attached to the end of the lead configured to connect to the fastener.

10. The system of claim 1, wherein the junction mount comprises a ledge configured to connect to the fastener to secure the conductive lead.

11. The system of claim 1, wherein the conductive lead comprises a lead foil and wherein the fastener is configured to secure the lead foil around a portion of the junction mount.

12. The system of claim 1, wherein the fastener comprises an electrically conductive coating to seal a space between the fastener and the junction mount.

13. The photovoltaic module connection system of claim 12, wherein the sidewall has an opening and the wire extends through the opening to the junction mount.

14. The photovoltaic module connection system of claim 12, comprising a plurality of junction mounts and a plurality of conductive leads and wire pairs, each pair connected by a fastener to a separate junction mount.

15. The photovoltaic module connection system of claim 14, wherein one or more of said junction mounts comprises a ledge within the compartment.

16. The photovoltaic module connection system of claim 15, wherein said compartment contains a sealant over the junction mount.

17. A photovoltaic module connection system comprising:
a cord plate capable of being on a surface of a photovoltaic module;
a junction mount within a compartment surrounded by a sidewall extending outward from a surface of the cord plate, the surface and compartment including a channel through which a conductive lead extends through the cord plate to the junction mount;
a wire extending through the sidewall to the junction mount; and
a clip that electrically connects an end of a wire to the conductive lead at the junction mount, the clip comprising:
a top plate comprising a first side edge, a second side edge, and a bottom surface;
a first side spring finger extending from the first side edge of the top plate to a first terminal edge away from the bottom surface of the top plate;
a second side spring finger extending from the second side edge of the top plate to a second terminal edge away from the bottom surface of the top plate;
a first top gripping extension projecting from the first terminal edge of the first side spring finger toward the bottom surface of the top plate; and
a second top gripping extension projecting from the second terminal edge of the second side spring finger toward the bottom surface of the top plate.

18. The photovoltaic module connection system of claim 17, wherein the compartment contains a sealant.

19. A method of electrically connecting a wire to a photovoltaic module comprising:
positioning a cord plate adjacent to a conductive lead extending through a surface of a photovoltaic module;
wherein the cord plate comprises a sidewall extending outward from a surface of the cord plate and defining a compartment on the surface of the cord plate, the surface including an opening configured to allow the conductive lead to extend from beneath the cord plate to a junction mount within the compartment defined by the sidewall; and
electrically connecting an end of a wire to the conductive lead with a fastener at the junction mount, wherein the fastener comprises:
a top plate comprising a first side edge, a second side edge, and a bottom surface;
a first side spring finger extending from the first side edge of the top plate to a first terminal edge away from the bottom surface of the top plate;
a second side spring finger extending from the second side edge of the top plate to a second terminal edge away from the bottom surface of the top plate;
a first top gripping extension projecting from the first terminal edge of the first side spring finger toward the bottom surface of the top plate; and a second top gripping extension projecting from the second terminal edge of the second side spring finger toward the bottom surface of the top plate.

20. The method of claim 19, wherein the fastener comprises a metal.

21. The method of claim 19, wherein the fastener comprises galvanized metal sheet.

22. The method of claim 19, wherein the fastener comprises a conductive material.

23. The method of claim 19, wherein the fastener comprises a protective coating.

24. The method of claim 19, wherein the step of electrically connecting an end of a wire to the conductive lead with a fastener comprises clamping the fastener to the end of the wire.

25. The method of claim 19, wherein the step of electrically connecting an end of wire to the conductive lead with a fastener comprises crimping the fastener to the end of the wire.

26. The method of claim 19, wherein the step of electrically connecting an end of a wire to the conductive lead with a fastener comprises soldering the fastener end of the wire.

27. The method of claim 19, further comprising the step of attaching an end of the conductive lead to the junction mount after positioning the end of the conductive lead adjacent to the junction mount.

28. The method of claim 19, wherein the junction mount comprises a ledge portion of a cord plate configured to connect to the fastener to secure the conductive lead.

29. The method of claim 19, wherein the conductive lead comprises a lead foil and wherein the fastener is configured to secure the lead foil around a portion of the junction mount.

30. The method of claim 19, wherein the fastener comprises an electrically conductive coating to seal a space between the fastener and the junction mount.

31. The method of claim 19, comprising filling the area with a flowable sealant after electrically connecting the wire and conductive lead.

* * * * *